United States Patent
Burgin et al.

(10) Patent No.: US 9,354,078 B2
(45) Date of Patent: May 31, 2016

(54) METHODS AND SYSTEMS FOR INDICATING WHETHER AN AIRCRAFT IS WITHIN DISTANCE AND ALTITUDE CRITERIA FOR AN IFR PROCEDURE TURN

(75) Inventors: Roger W. Burgin, Scottsdale, AZ (US); Dave Pepitone, Sun City West, AZ (US); Blake Wilson, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 456 days.

(21) Appl. No.: 13/612,689

(22) Filed: Sep. 12, 2012

(65) Prior Publication Data
US 2014/0074324 A1 Mar. 13, 2014

(51) Int. Cl.
*B64D 45/00* (2006.01)
*G01C 23/00* (2006.01)
*G08G 5/02* (2006.01)
*G08G 5/00* (2006.01)

(52) U.S. Cl.
CPC ............ *G01C 23/00* (2013.01); *B64D 45/00* (2013.01); *G08G 5/0021* (2013.01); *G08G 5/02* (2013.01)

(58) Field of Classification Search
CPC ............................... B65D 45/00; G01C 23/00
USPC ............ 701/1–5, 8, 9, 14–18, 116–122, 400, 701/410, 411; 340/945–951, 963, 970; 342/33–35
See application file for complete search history.

(56) References Cited

U.S. PATENT DOCUMENTS

| | | | |
|---|---|---|---|
| 5,057,835 A | 10/1991 | Factor et al. | |
| 5,471,205 A | 11/1995 | Izawa | |
| 6,006,158 A * | 12/1999 | Pilley et al. | 701/120 |
| 6,182,005 B1 * | 1/2001 | Pilley et al. | 701/120 |
| 6,195,609 B1 * | 2/2001 | Pilley et al. | 701/120 |
| 6,282,466 B1 * | 8/2001 | Nolte et al. | 701/11 |
| 6,314,363 B1 | 11/2001 | Pilley et al. | |
| 6,868,320 B1 * | 3/2005 | Burch | 701/467 |
| 6,930,617 B2 | 8/2005 | Chamas et al. | |
| 6,980,892 B1 | 12/2005 | Chen et al. | |
| 7,072,746 B1 * | 7/2006 | Burch | 701/14 |
| 7,415,336 B1 * | 8/2008 | Burch | 701/468 |
| 7,693,621 B1 | 4/2010 | Chamas | |
| 7,737,867 B2 * | 6/2010 | Arthur et al. | 340/980 |
| 7,786,900 B2 | 8/2010 | Bitar et al. | |
| 7,903,000 B2 | 3/2011 | Hammack et al. | |
| 7,962,279 B2 * | 6/2011 | Pepitone et al. | 701/120 |
| 8,032,266 B2 | 10/2011 | Bitar et al. | |

(Continued)

FOREIGN PATENT DOCUMENTS

EP 2400273 A2 12/2011

OTHER PUBLICATIONS

EP Search Report, EP 13183255.2-1557 dated Aug. 1, 2014.

(Continued)

*Primary Examiner* — James Trammell
*Assistant Examiner* — Majdi Alsomiri
(74) *Attorney, Agent, or Firm* — Ingrassia Fisher & Lorenz, P.C.

(57) ABSTRACT

Methods and systems are provided for displaying visually distinguishing characteristics if an aircraft is below a minimum altitude or beyond a maximum distance when executing a procedure turn. A procedure turn icon, an aircraft icon indicating the aircraft's present location, terrain/obstacles, and the visually distinguishing characteristics are displayed on a moving map.

14 Claims, 6 Drawing Sheets

(56) References Cited

U.S. PATENT DOCUMENTS

| | | |
|---|---|---|
| 8,032,268 B2 | 10/2011 | Burgin et al. |
| 2004/0225432 A1* | 11/2004 | Pilley et al. .................. 701/117 |
| 2005/0200501 A1 | 9/2005 | Smith |
| 2008/0177432 A1 | 7/2008 | Deker et al. |
| 2010/0017105 A1* | 1/2010 | Pepitone et al. ............. 701/120 |
| 2010/0030401 A1* | 2/2010 | Rogers et al. ..................... 701/3 |
| 2011/0313597 A1 | 12/2011 | Wilson et al. |

OTHER PUBLICATIONS

EP Exam Report, EP 13183255.2-1557 dated Jan. 22, 2014.

\* cited by examiner

METHODS AND SYSTEMS FOR INDICATING WHETHER AN AIRCRAFT IS WITHIN DISTANCE AND ALTITUDE CRITERIA FOR AN IFR PROCEDURE TURN

TECHNICAL FIELD

The exemplary embodiments described herein relates generally to avionics systems and more particularly to flight management systems and related cockpit displays adapted for indicating whether an aircraft is satisfying distance and altitude criteria for an instrument flight rules (IFR) procedure turn that is associated with an Instrument Approach Procedure. The purpose of procedure turns on IFR instrument approach procedures is to allow the aircraft to turn while aligning its flight track with the inbound course to the landing runway.

BACKGROUND

The minimum (or lowest) safe altitude is used in aviation to designate an altitude level deemed safe over a particular flight path such as procedure turns which are part of instrument approaches into airports. Generally, the minimum safe altitude is an altitude level that incorporates a safety buffer above the obstacles and/or terrain within a particular geographic region proximate to a route that an aircraft may travel while executing an instrument approach. The minimum safe altitude is intended to ensure clearance over obstacles and terrain during flight.

Often, the minimum safe altitude is determined based on criteria provided by a governmental or regulatory organization. For example, in the United States, the Federal Aviation Administration defines criteria for the minimum safe altitude in the Federal Aviation Regulations. The regulations may provide a specific safety buffer for determining the minimum safe altitude for a procedure turn, for example, an altitude of 1,000 feet above the highest obstacle within a horizontal distance of four nautical miles. By flying an aircraft at or above the minimum safe altitude, the pilot complies with the terrain and obstacle clearance requirements for the particular procedure turn.

A great many instrument approach procedures require a procedure turn (course reversal) to place the aircraft in a straight in position and direction for the published final approach course. While executing the course reversal or procedure turn, the aircraft is required to remain within a stated distance, typically 10 nm, of some navigational fix on the approach procedure while maintaining a minimum altitude for the reversal turn.

For accomplishing a procedure turn in accordance with instrument flight rules (IFR), the minimum safe altitudes and maximum safe distance are often published on aeronautical charts for the procedure turn for an associated navigation reference point. These aeronautical charts are published as printed procedures or charts, also known as approach plates.

The protected area boundaries are established for a number of reasons such as obstacle clearance, noise abatement or both. This requirement keeps the aircraft in a geographical area that has been inspected and is known to contain no obstacles or terrain that would be a threat to the aircraft, provided that the aircraft is higher than the published minimum altitude and stays within the published mileage of the stated navigational fix published as part of the procedure.

It is up to the pilot to use current navigation aids (GPS, DME) to establish whether the aircraft is within the protected area. This usually requires that the pilot monitor the aircraft navigation position and distance from the fix establishing the mileage limit for the procedure turn. Depending on the navigation source (DME or GPS) and the fix from which the mileage limit was established, the task of flying the procedure turn can become a fairly complex and high workload task. The pilot, for instance, may have to monitor a different page on the GPS unit or a second VOR/DME may have to be tuned to establish the proper distance from the navigation fix and to ascertain whether the aircraft is within the protected airspace. This additional workload is taxing to the pilot while attending to many tasks on the approach.

Generally, a pilot must maintain copies of these printed charts and utilize the proper chart during flight. After identifying the proper chart, the pilot must locate the appropriate procedure turn that corresponds to the intended flight path of the aircraft, the corresponding minimum safe altitude and maximum distance for the procedure turn, and then compare it to the current altitude and distance of the aircraft to determine if the minimum safe altitude and maximum safe distance criteria for the procedure turn is met. The published charts are oriented north-up and often require a pilot to manually rotate and position the chart to orient it based on the current heading of the aircraft. Additionally, these charts often include a variety of other information relating to the given navigational facility, further obfuscating the desired minimum safe altitude and maximum safe distance information. Thus, using and maintaining the printed charts is both cumbersome and confusing.

Accordingly, it is desirable to provide a graphical display of procedure turn airspace, including minimum safe altitude, maximum safe distance from the navigation fix, the current location of the aircraft within the airspace, and an alert when approaching or surpassing the minimum safe altitude and maximum safe distance. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A method and system are provided for displaying whether an aircraft is below a designated altitude level and within a designated distance when executing a procedure turn.

A first exemplary embodiment describes a method for indicating on a display device associated with an aircraft whether the aircraft is satisfying defined criteria for a maneuver, the method comprising displaying a graphical representation on the display device of a procedure turn symbol associated with a procedure turn from a navigation point, the procedure turn corresponding having a maximum distance criterion from the navigation point, and a minimum altitude criterion; and providing an alert by displaying a first visually distinguishing characteristic if a current altitude of the aircraft is below the minimum altitude criterion, and a second visually distinguishing characteristic if a current distance from the navigation point is beyond the maximum distance criterion.

A third exemplary embodiment describes a method for indicating on a display device associated with an aircraft whether the aircraft is satisfying defined criteria for a maneuver, the method comprising identifying a procedure turn; displaying symbols on the display device for the current location of the aircraft and the procedure turn; providing a first alert if the current altitude of the aircraft will be going below the minimum altitude based on current flight parameters, or is below the minimum altitude; providing a second alert if the current distance from the navigation point will be going beyond the maximum distance based on current flight parameters, or is beyond the maximum distance; and repeating from the displaying symbols step.

A fourth exemplary embodiment describes a system for notifying the aircrew of an aircraft when exceeding a minimum altitude and a maximum distance during execution of a procedure turn, comprising a flight management system configured to store data including the minimum altitude and the maximum distance for the procedure turn; determine the current location and altitude of the aircraft; and determine if the aircraft is below the minimum altitude value or beyond the maximum distance; a display device configured to display a moving map including terrain; display an icon of the aircraft in its current location on the moving map; display an icon of the procedure turn on the moving map; display a first visually distinguishing characteristic if the aircraft goes below the minimum altitude value; and display a second visually distinguishing characteristic if the aircraft goes beyond the maximum altitude value.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Technologies and concepts discussed herein relate to flight management systems adapted for indicating, on a display device associated with an aircraft, whether the aircraft is within the designated criteria for a procedure turn. If the aircraft is below a designated minimum safe altitude, or exceeding a designated distance from the navigation point, the procedure turn is displayed using a first visually distinguishable characteristic which indicates noncompliance with the criteria. Otherwise, if the aircraft is above the designated minimum safe altitude and within the designated distance, the sector is displayed using a second visually distinguishable characteristic which indicates compliance with the criteria.

The current invention describes a way to graphically depict the protected area of a procedure turn on the chart or moving map display. Aircraft position as represented by the aircraft symbol will be superimposed on the moving map display to make it clear to the pilot where the aircraft is positioned and moving relative to the boundaries of the altitude and distance limits for the procedure reversal turn. The pilot does not have to monitor mileage, tune or monitor additional GPS or DME readouts, but merely has to look at the display to ascertain location relative to the protected airspace boundaries. The depiction of the protected airspace will also be accompanied by visual alerts when the aircraft is about to penetrate the lateral or vertical limits of the protected airspace. Algorithms are processed to provide advisory alert messages to the pilot when the algorithm predicts that the aircraft may violate, or has violated, vertical or lateral boundaries of the protected airspace.

Audio and visual advisories can be issued to the pilot if the aircraft is about to penetrate the floor (minimum altitude in MSL during the procedure turn or course reversal) of the protected space. If the system detects that the pilot will penetrate the floor of the protected space, a visual amber alert, for example, will be issued. Using the aircraft's vertical rate of descent the display can predict when the aircraft is about to penetrate the floor of the protected airspace. An algorithm determines when to issue an alert based on, for example, rate of descent (vertical speed in fps), time to initiate recovery to level flight with, for example, a maximum 2.5 g pull-up, and crew reaction time. The protected airspace can be colored amber once the alert is triggered.

Likewise a similar alert can be issued if the system detects that the aircraft will penetrate the lateral radius boundaries (aircraft is about to exceed the maximum distance limit). The algorithm may consider the speed of the aircraft, crew reaction time, and bank angle and bank angle rate in calculating the radius of a turn for any given time. If the system detects the aircraft is approaching the maximum distance limit within a distance where a recovery standard rate turn is not possible to maintain the aircraft within the maximum distance, an alert can be issued.

The protected area of the procedure turn is rendered as a geometric graphic enclosing the navigation fix defining the area and radials from that point along and perpendicular to the inbound course on the protected side, and an arc between their end points at the distance specified in the procedure. The aircraft symbol will also be shown at the actual position relative to the navigation fix.

Figure 1:
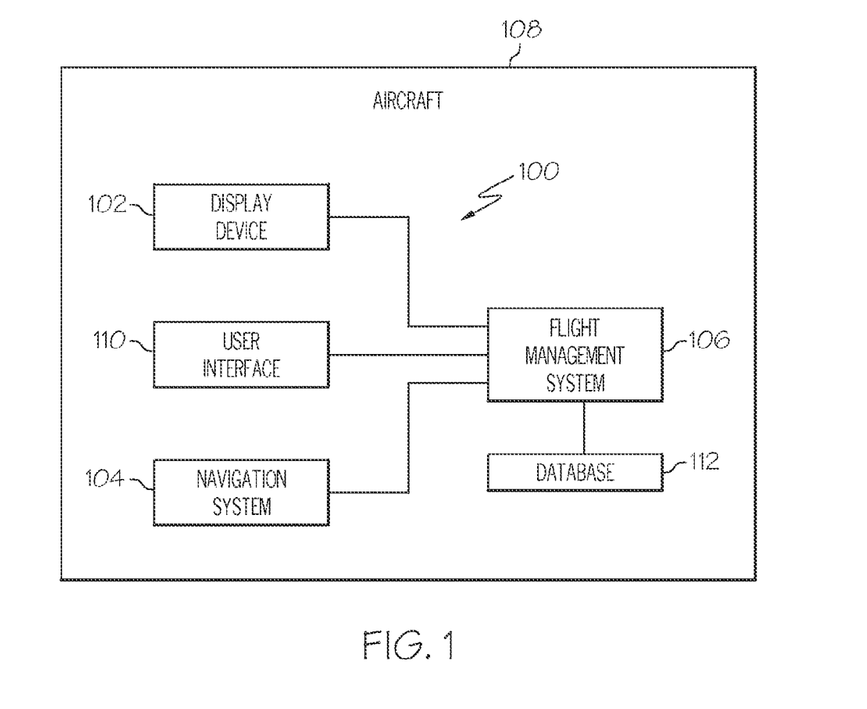
FIG. 1 is a block diagram of a display system suitable for use in an aircraft in accordance with one embodiment.

FIG. 1 depicts an exemplary embodiment of a display system 100, which may be located onboard an aircraft 108. This embodiment of display system 100 may include, without limitation, a display device 102, a navigation system 104, and a flight management system 106 (FMS). The display system 100 may further include a user interface 110 for enabling interactivity with the display system 100. The display system 100 may also include a database 112 suitably configured to support operation of the display system 100 as described in greater detail below.

It should be understood that FIG. 1 is a simplified representation of a display system 100 for purposes of explanation and ease of description, and FIG. 1 is not intended to limit the application or scope of the subject matter in any way. In practice, the display system 100 and/or aircraft 108 will include numerous other devices and components for providing additional functions and features, as will be appreciated in the art.

In an exemplary embodiment, the display device 102 is coupled to the flight management system 106. The flight management system 106 is coupled to the navigation system 104 for obtaining real-time data and/or information regarding operation of the aircraft 108. The flight management system 106 is configured to display, render, or otherwise convey one or more graphical representations or images associated with operation of the aircraft 108 on the display device 102, as described in greater detail below. In accordance with one or more embodiments, the flight management system 106 is configured to determine and indicate on the display device 102 whether the aircraft 108 is above or below a predetermined minimum safe altitude level and within or beyond a predetermined distance for a procedure turn proximate to an identified navigational reference point. In this regard, the user interface 110 may be coupled to the flight management system 106 to allow a pilot and/or crew member to indicate and/or identify a desired navigational reference point, as described in greater detail below.

In an exemplary embodiment, the display device 102 is realized as an electronic display configured to graphically display flight information or other data associated with operation of the aircraft 108 under control of the flight management system 106, as will be understood. In an exemplary embodiment, the display device 102 is located within a cockpit of the aircraft 108. It will be appreciated that although FIG. 1 shows a single display device 102, in practice, additional display devices may be present onboard the aircraft 108. The user interface 110 may also be located within the cockpit of the aircraft 108 and adapted to allow a user (e.g., pilot, co-pilot, or crew member) to interact with the flight management system 106, as described in greater detail below. In various embodiments, the user interface 110 may be realized as a keypad, touchpad, keyboard, mouse, touchscreen, joystick, or another suitable device adapted to receive input from a user. In an exemplary embodiment, the user interface 110 and flight management system 106 are cooperatively configured to enable a user to indicate and/or select a desired navigational reference point, as described below.

The display 102 is configured to provide the enhanced images to the operator. In accordance with an exemplary embodiment, the display 102 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 102 may additionally be implemented as a panel mounted display, a HUD (head-up display) projection, or any one of numerous known technologies. It is additionally noted that the display 102 may be configured as any one of numerous types of aircraft flight deck displays. For example, it may be configured as a multi-function display, a horizontal situation indicator, or a vertical situation indicator. In the depicted embodiment, however, the display 102 is configured as a primary flight display (PFD).

In operation, the display device 102 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 102 is suitably designed to process data obtained from the sources of flight status data in the manner described in more detail herein. In particular, the display device 102 can use the flight status data of the host aircraft when rendering the display.

It should be appreciated that although FIG. 1 shows the display device 102 and user interface 110 within the aircraft 108, in practice, either or both may be located outside the aircraft 108 (e.g., on the ground as part of an air traffic control center or another command center) and communicatively coupled to the flight management system 106 over a data link. For example, the display device 102 and/or user interface 110 may communicate with the flight management system 106 using a radio communication system or another data link system, such as a controller pilot data link (CPDL).

In an exemplary embodiment, the navigation system 104 is configured to obtain one or more navigational parameters associated with operation of the aircraft 108. The navigation system 104 may be realized as a global positioning system (GPS), inertial reference system (IRS), or a radio-based navigation system (e.g., VHF omni-directional radio range (VOR) or long range aid to navigation (LORAN)), and may include one or more sensors suitably configured to support operation of the navigation system 104, as will be appreciated in the art. In this regard, navigation system 104 may communicate with one or more navigational aids, as will be understood. In an exemplary embodiment, the navigation system 104 is capable of obtaining and/or determining the current location of the aircraft 108 (e.g, the latitude and longitude) and the heading of the aircraft 108 (i.e., the direction the aircraft is traveling in relative to some reference) and providing these navigational parameters to the flight management system 106.

In an exemplary embodiment, the flight management system 106 (or, alternatively, a flight management computer) is located onboard the aircraft 108. Although FIG. 1 is a simplified representation of display system 100, in practice, the flight management system 106 may be coupled to one or more additional modules or components as necessary to support navigation, flight planning, and other aircraft control functions in a conventional manner. In an exemplary embodiment, the flight management system 106 is configured to obtain and/or determine the instantaneous altitude of the aircraft 108. In addition, the flight management system 106 may include or otherwise access a terrain database or other navigational information for rendering a navigational map on the display device 102, as described below. The navigational map may be based on one or more sectional charts, topographic maps, digital maps, or any other suitable commercial or military database or map, as will be appreciated in the art.

In an exemplary embodiment, the flight management system 106 accesses or includes a database 112 that contains designated minimum safe altitude and maximum safe distance information for a plurality of known procedure turns. The navigational reference points may comprise navigational aids, such as VHF omni-directional ranges (VORs), distance measuring equipment (DMEs), tactical air navigation aids (TACANs), and combinations thereof (e.g., VORTACs). As used herein, "navigational reference point" and variants thereof should also be understood as encompassing position fixes, such as initial approach fixes (IAFs), final approach fixes (FAFs) and other navigational reference points used in area navigation (RNAV). In an exemplary embodiment, the navigational reference points are located near a landing location (e.g., an airport). In this regard, the landing location and/or navigational reference point may have one or more associated approaches, wherein the designated minimum safe altitude may be displayed on a published chart or approach plate for the navigational reference point. In an exemplary embodiment, for each navigational reference point, the database 112 maintains information regarding a procedure turn associated with the navigational reference point, along with a designated minimum safe altitude and designated maximum distance for each procedure turn. For example, the database 112 may maintain, for each procedure turn, one or more bearings which define the angular boundaries of the sector, a distance or radius which defines the radial extent of the sector from the navigational reference point, and a designated minimum safe altitude for the sector.

Figure 2:
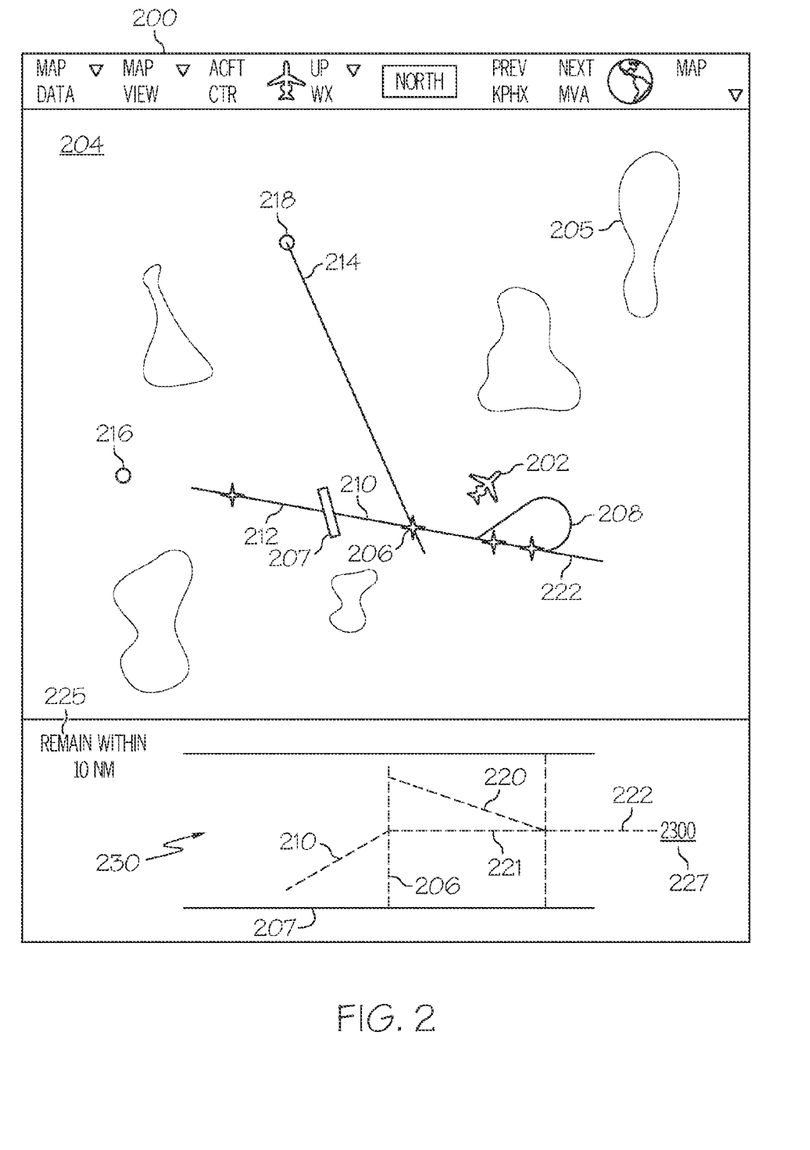
FIG. 2 is a schematic view of an exemplary navigational map suitable for use with the display system of FIG. 1.

Referring now to FIG. 2, and with continued reference to FIG. 1, the flight management system 106 is configured to control the rendering of a navigational map 200 graphically displayed on the display device 102. The flight management system may also be configured to render a graphical representation of the aircraft 202 on the map 200, which may be overlaid or rendered on top of a background 204. The background 204 may be a graphical representation of the terrain, topology, or other suitable items or points of interest 205 within a given distance of the aircraft 202, which may be maintained by the flight management system 106 in a terrain database or navigational database, as will be understood. As described in greater detail below, the flight management system 106 may also render a graphical representation of an identified navigational reference point 206 along with a procedure turn symbol 208 associated with the identified navigational reference point 206 and the radial 222 from navigation aid 216 overlying the background 204. In an exemplary embodiment, the navigational reference point 206 is located proximate a landing location 207 (e.g., airport, runway, landing strip) having an approach path 210 and may be defined, for example, by radials 212, 214 from navigational aids 216, 218, respectively. The flight management system 106 may be configured to render or display a graphical representation of the landing location 207 and the associated approach path 210 on the navigational map 200, as will be understood.

Although FIG. 2 depicts a top view (e.g., from above the aircraft 202) of the navigational map 200, in practice, alternative embodiments may utilize various perspective views, such as side views, three-dimensional views (e.g., a three-dimensional synthetic vision display), angular or skewed views, and the like. Further, in some embodiments, the aircraft 202 preferably is shown as traveling across the map 200, typically referred to as a moving map, as opposed to being located at a fixed position on the map 200, and FIG. 2 does not limit the scope of the subject matter in any way.

In an exemplary embodiment, the map 200 is associated with the movement of the aircraft, and the background 204 refreshes or updates as the aircraft travels, such that the graphical representation of the aircraft 202 is positioned over the background 204 in a manner that accurately reflects the instantaneous (or substantially real-time) real-world positioning of the aircraft 202 relative to the earth. In accordance with one embodiment, the map 200 is updated or refreshed such that it is centered on and/or aligned with the aircraft 202. Although the navigational map 200 shown in FIG. 2 is oriented north-up (i.e., moving upward on the map 200 corresponds to traveling northward), as described below, in other embodiments, the navigational map 200 may be oriented track-up or heading-up, i.e., aligned such that the aircraft 202 is always traveling in an upward direction and the background 204 adjusted accordingly.

Optionally, a side view 230 may be displayed on the navigational map 200, including the navigation reference point 206, the landing location 207, the approach path 210, the lateral limit (maximum safe distance) 220, and the minimum altitude 227 (2300 feet in this embodiment). The intended path of the aircraft is represented by lines 220, 221.

Referring now to FIGS. 3-6, in exemplary embodiments, a display system 100 may be configured to perform a procedure turn display process 300, 600 and additional tasks, functions, and operations described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the display device 102, the navigation system 104, the flight management system 106, the user interface 110, or the database 112. It should be appreciated that any number of additional or alternative tasks may be included, and may be incorporated into a more comprehensive procedure or process having additional functionality not described in detail herein. Moreover, one or more of the tasks shown in FIGS. 3 and 6 could be omitted from an embodiment of the process 300, 600 as long as the intended overall functionality remains intact.

Referring again to FIGS. 3 and 6, and with continued reference to FIG. 1 and FIG. 2, a procedure turn display process 300, 600 may be performed to indicate whether an aircraft is below the minimum safe altitude and within a maximum distance for a procedure turn associated with a navigational reference point. In an exemplary embodiment, the procedure turn display process 300, 600 may initialize by identifying 302, 602 a navigational reference point. In accordance with one embodiment, the navigational reference point may be identified by a user (e.g., a pilot or air traffic controller). For example, the user may designate or select a destination airport and/or landing location via user interface 110. In an exemplary embodiment, the airport and/or landing location has a designated IFR approach procedure which includes a procedure turn. In response to the user input, the flight management system may identify a navigational reference point associated with the identified airport and/or landing location, which is used to define a procedure turn proximate the airport and/or landing location. Alternatively, the flight management system may automatically identify a navigational reference point. For example, the flight management system may identify the navigational reference point based on an airport and/or landing location previously entered into a flight plan. Alternatively, the flight management system may access a database (e.g., database 112) and determine the navigational reference point that is nearest the current location of the aircraft.

Figure 3:
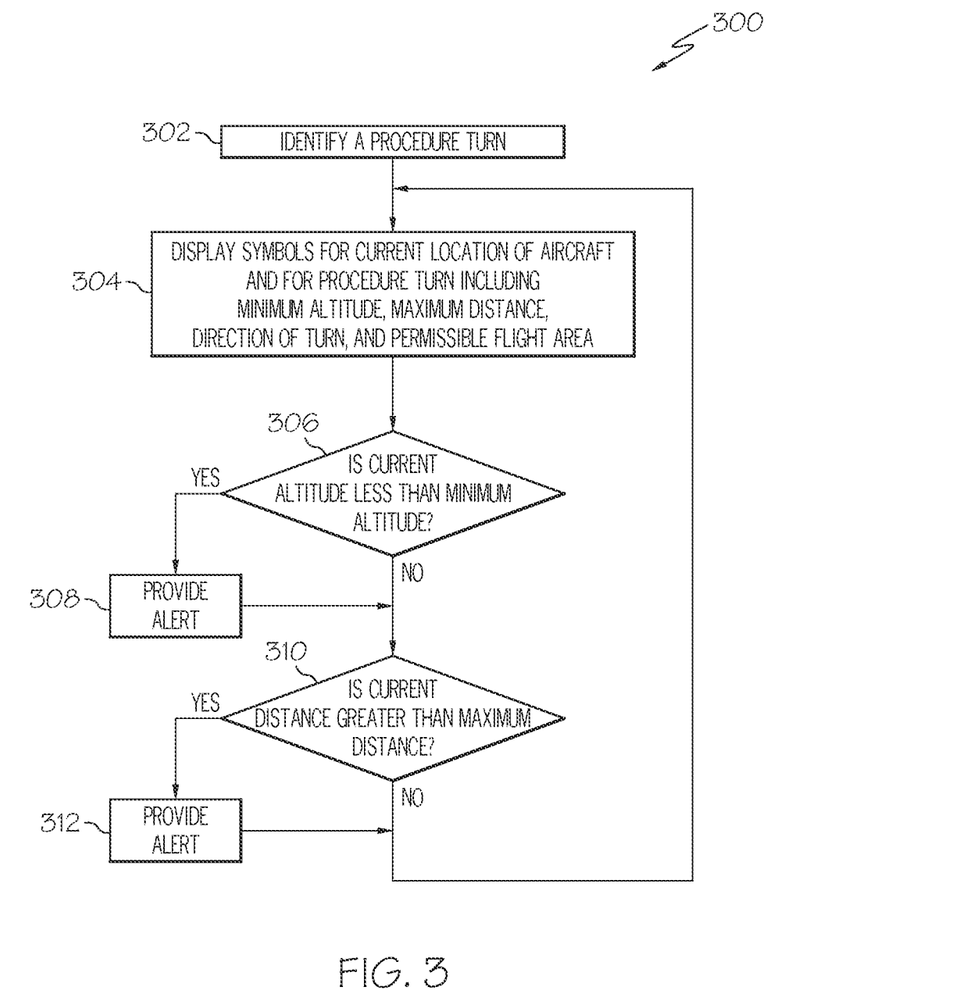
FIG. 3 a flow diagram of an exemplary procedure turn display process suitable for use with the display system of FIG. 1 in accordance with a first exemplary embodiment.
Figure 6:
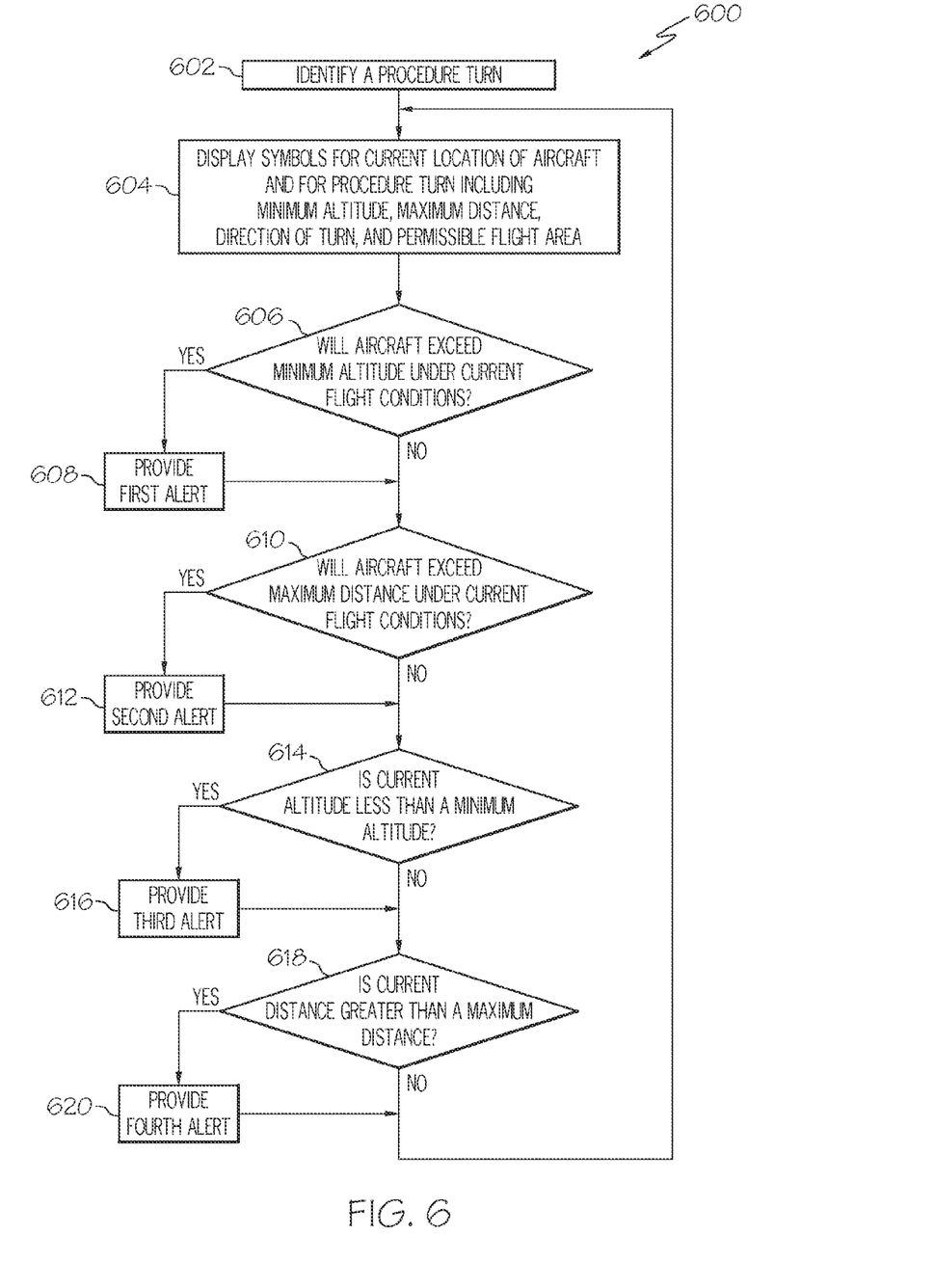
FIG. 6 a flow diagram of an exemplary procedure turn display process suitable for use with the display system of FIG. 1 in accordance with a second exemplary embodiment.

Referring now to FIG. 2, with continued reference to FIG. 1, FIG. 3, and FIG. 6, by way of example, the flight management system 106 may identify a navigational reference point 206 as the identified navigational reference point. After identifying the navigational reference point 206, the flight management system 106 obtains the relevant data (minimum altitude, maximum distance, direction of turn, area for aircraft operation during execution of the procedure turn) associated with the navigational reference point 206. The minimum altitude criterion may be determined based on the real-world terrain and/or obstacles within the geographical area in the vicinity of the procedure turn 208 and adjusted to incorporate a safety buffer, which may be prescribed, for example, by regulations set forth by a governmental and/or regulatory body or airline company/operator.

In the exemplary embodiments, the procedure turn display process 300, 600 continues by displaying 304. 604 a graphical representation of the current aircraft location, a procedure turn symbol 208 associated with the identified navigational reference point 206, the minimum altitude 227, and the maximum distance 225.

In the exemplary embodiment, the procedure turn 208 is displayed overlying the terrain background 204 of the navigational map 200. The procedure turn 208 may have an initial or default display state (e.g., no visual effects, no obviously distinguishable visible characteristics, or the like). Although text conveying the respective minimum altitude 227 and maximum distance 225 for the procedure turn 208 is displayed within the procedure turns in FIG. 2, in alternative embodiments, the respective minimum altitude and maximum distance may be displayed outside the procedure turns or omitted entirely. In accordance with the embodiment illustrated in FIG. 2, the procedure turn 208 is preferably displayed in the center of the navigational map 200. As shown in FIG. 2, the procedure turn 208 is aligned with the navigational reference point 214 in a manner proximate to the navigational reference point 206. For example, as shown in FIG. 2, a graphical representation of the aircraft 216 is displayed within the geographic area 223 at a location that correlates with the real-world location of the aircraft 202 relative to the navigational reference point 206. In an exemplary embodiment, the aircraft 216 is displayed and/or positioned such that it reflects the instantaneous heading of the aircraft. Furthermore, while the procedure turn 208 is shown as a "tear drop", it may take any one of a number of graphical representations, including a commonly used "barb" (not shown).

Referring now to FIG. 3 and FIG. 6, with continued reference to FIG. 1 and FIG. 2, the procedure turn process 300, 600 may be configured to operate in a north-up mode or a track-up mode. FIG. 2 depicts the navigational map 200 in north-up mode, although the navigational map 200 could be depicted in a in track-up mode. As shown in FIG. 2, in north-up mode, the procedure turn 208 is oriented such that the upward direction corresponds to North. The aircraft 216 is oriented in a manner that reflects the current heading of the aircraft relative to North.

Figure 4:
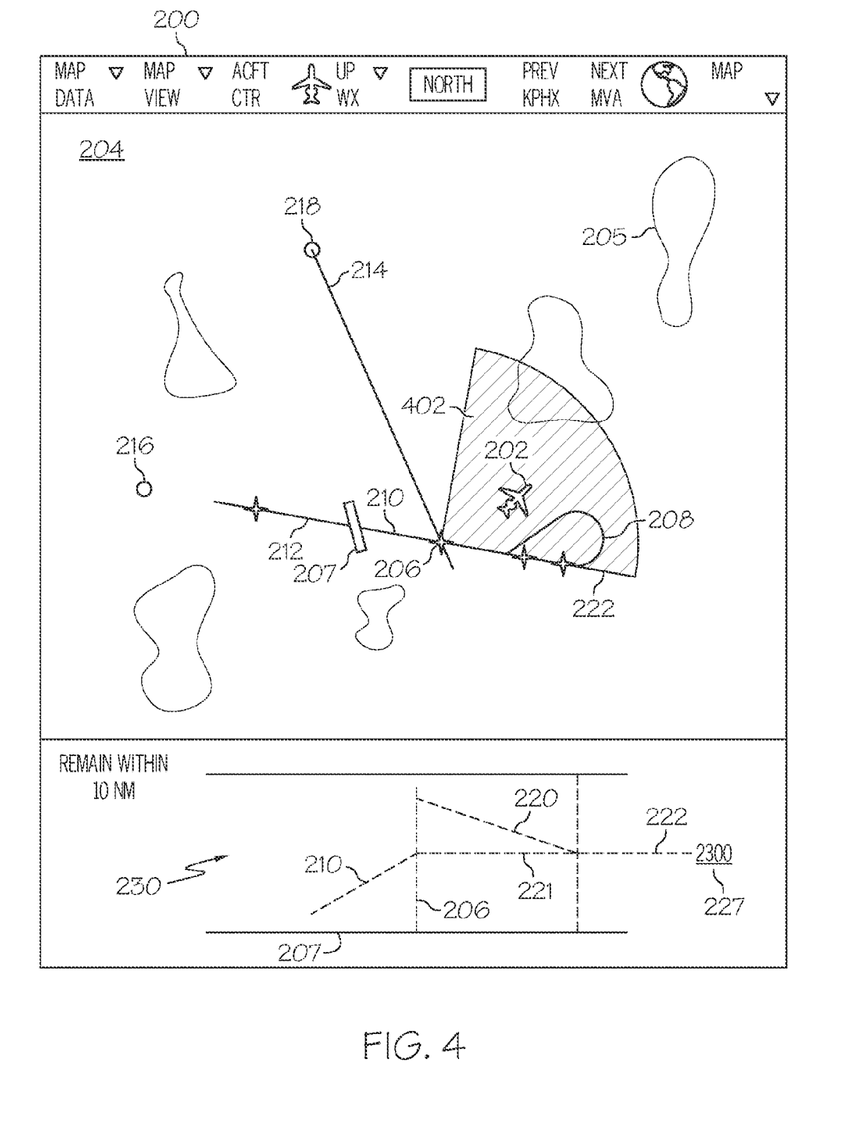
FIG. 4 is a schematic view of a navigational map in accordance with the first exemplary embodiment illustrating a first alert.
Figure 5:
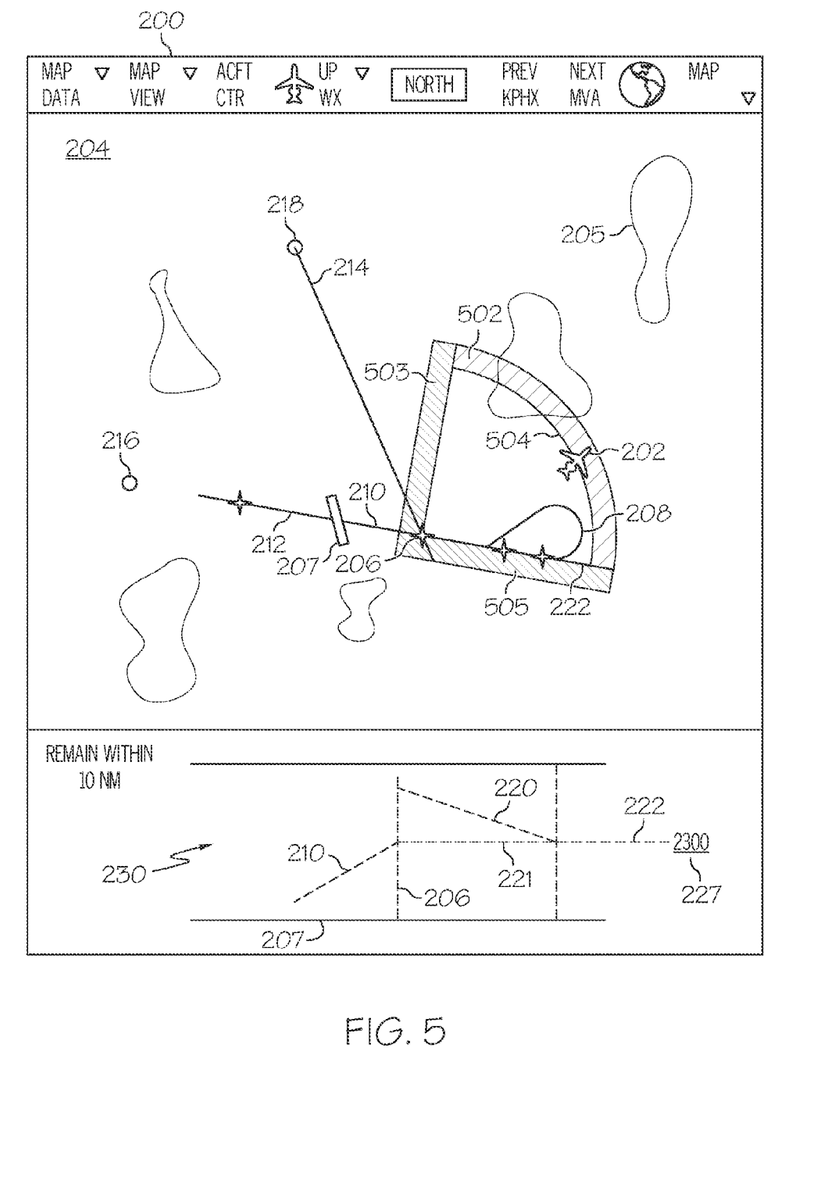
FIG. 5 is a schematic view of a navigational map in accordance with the first exemplary embodiment illustrating a second alert.

In the exemplary embodiment of FIG. 3, the procedure turn display process 300 continues by comparing 306 the current altitude of the aircraft 202 to the minimum altitude value 227 for the identified procedure turn 208. If the current altitude of the aircraft is below the minimum altitude criterion, the altitude sector display process 300 provides an alert 308 by displaying the procedure turn using a first visually distinguishing characteristic which is chosen to indicate that the aircraft is below the designated altitude level for the identified sector. FIG. 4 illustrates the geographic area 402 as being cross-hatched, although the visually distinguishable characteristic may be realized by using one more of the following: color, hue, tint, brightness, graphically depicted texture or pattern, contrast, transparency, opacity, animation (e.g., strobing, flickering or flashing), and/or other graphical effects. In a preferred embodiment, the geographic area 402 would comprise a color, for example, amber. In the exemplary embodiments, the visually distinguishable characteristic is used to highlight or focus the user's attention on being below the minimum altitude. For example, referring again to FIG. 4, if the aircraft is below 2300 feet, the geographic area 402 may be displayed by shading and/or filling the interior of the geographic area 402 using amber, yellow, or another color designed to warn the pilot that the aircraft is below the designated minimum safe altitude for the procedure turn. In other embodiments, the interior of the geographic region 402 may be displayed with another visually distinguishable characteristic (brightness, contrast, tint, transparency, opacity) relative to the remaining images displayed on the navigational map 200. Similarly, the interior of geographic area 402 may be highlighted by using a distinguishable animation or other graphical effects to alert the user of noncompliance with the minimum altitude level. Alternatively and for example, the visually distinguishable characteristic may be applied to the outline of the identified geographic region 402, text associated with the geographic region 402, or the image of the aircraft 202. In some embodiments, the procedure turn display process 300 may also provide an audible warning to inform the pilot that the aircraft is below the designated minimum safe altitude for the procedure turn.

In a like manner, the procedure turn display process 300 continues by comparing 310 the current altitude of the aircraft 202 to the maximum distance value 225 for the identified procedure turn 208. If the current distance of the aircraft 202 is greater than the maximum distance value 225 criterion, the procedure turn display process 300 provides an alert 312 by displaying the procedure turn using a first visually distinguishing characteristic which is chosen to indicate that the aircraft is beyond the designated distance for the identified procedure turn. The visually distinguishable characteristic indicating the current distance is beyond the maximum distance may be as described for the visually distinguishable characteristic as discussed above for step 308; however, a first visually distinguishable characteristic preferably would be used for going below the minimum altitude and a second visually distinguishable characteristic would be used for going beyond the maximum distance. For example, referring to FIG. 5, if the aircraft exceeds the maximum distance, or violates lateral boundaries 503, 505, the lateral boundaries 502, 503, 505 may be displayed by shading and/or filling the interior of the lateral boundaries 502, 503, 505 using amber, yellow, or another color designed to warn the pilot that the aircraft is below the designated minimum safe altitude or exceeding the lateral boundaries 503, 505 for the procedure turn. In other embodiments, the interior of the lateral boundaries 502, 503, 505 may be displayed with another visually distinguishable characteristic (brightness, contrast, tint, transparency, opacity) relative to the remaining images displayed on the navigational map 200. Similarly, the interior of lateral boundaries 502, 503, 505 may be highlighted by using a distinguishable animation or other graphical effects to alert the user of noncompliance with the minimum altitude level. Alternatively and for example, the visually distinguishable characteristic may be applied to the outline of the identified lateral boundaries 502, 503, 505, text associated with the geographic region 502, 503, 505, or the image of the aircraft 202. In some embodiments, the procedure turn display process 300 may also provide an audible warning to inform the pilot that the aircraft is below the designated minimum safe altitude for the procedure turn. Preferably, the inner radius 504 of the lateral boundary 502 is representative of the maximum distance from the navigational point 206 associated with the procedure tune 208.

It is again noted that first and second different alerts may be used: the first alert for dropping below the minimum altitude, and the second alert for exceeding the maximum distance.

In an exemplary embodiment, the loop defined by tasks 304, 306, 308, 310, 312 repeats as desired during operation of the aircraft. For example, the procedure turn display process 300 may continually refresh as long as the aircraft is executing the procedure turn.

In a second exemplary embodiment of FIG. 6, the procedure turn display process 600 continues by determining 606 whether the current altitude of the aircraft 202 will decrease below the minimum altitude value 227 for the identified procedure turn 208. This determination 606 is made by an algorithm in consideration of, for example, rate of descent (vertical speed in fps), time to initiate recovery to level flight with, for example, a maximum 2.5 g pull-up, and crew reaction time. If the algorithm determines the altitude of the aircraft will go below the minimum altitude criterion, the altitude sector display process 600 provides an alert 608 by displaying the procedure turn using a first visually distinguishing characteristic which is chosen to indicate that the aircraft is below the designated altitude level for the procedure turn. The visually distinguishable characteristic indicating the current distance will be going beyond the maximum distance may be as described for the visually distinguishable characteristic as discussed above for step 308. Likewise, in some embodiments, the procedure turn display process 600 may also provide an audible warning to inform the pilot that the aircraft will be going below the designated minimum safe altitude for the procedure turn.

In a like manner, the procedure turn display process 600 continues by determining 610 whether the distance of the aircraft 202 will exceed the maximum distance value 225 for the identified procedure turn 208 based on the current flying parameters. If the distance of the aircraft 202 will exceed the maximum distance value 225 criterion, the procedure turn display process 600 provides an alert 612 by displaying the procedure turn using a first visually distinguishing characteristic which is chosen to indicate that the aircraft is beyond the designated distance for the identified procedure turn. The visually distinguishable characteristic indicating the current distance is beyond the maximum distance may be as described for the visually distinguishable characteristic as discussed above for step 312. Likewise, in some embodiments, the procedure turn display process 600 may also provide an audible warning to inform the pilot that the aircraft is below the designated minimum safe altitude for the procedure turn.

It should be noted that first and second different alerts may be used: the first alert for determining that the aircraft will go below the minimum altitude, and the second alert for determining that the aircraft will exceed the maximum distance. Furthermore, the alerts for "going below" and "will be going below" the minimum altitude preferably may comprise two different types of alerts, and the alerts for "exceeding" and "will be exceeding" the maximum altitude preferably would comprise two different types of alerts.

In an exemplary embodiment, the loop defined by tasks 604, 606, 608, 610, 612, 614, 616, 618, 620 repeats as desired during operation of the aircraft. For example, the procedure turn display process 600 may continually refresh as long as the aircraft is executing the procedure turn.

To briefly summarize, the methods and systems described above allow a user, such as a pilot or crew member, to quickly identify and recognize whether an aircraft is flying below, or going to fly below, a designated minimum safe altitude and whether an aircraft is flying beyond, or going to fly beyond, a maximum distance for a procedure turn. This information can quickly and reliably be determined without the use of paper charts or the need to manually orient the procedure turn based on the current heading of the aircraft. The procedure turn may be displayed overlying the navigational map, either in the main portion of the map or to the side, and may be oriented as desired to provide greater situational awareness to a user.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for indicating on a display device associated with an aircraft whether the aircraft is satisfying defined criteria for a maneuver, the method comprising:
    displaying a graphical representation on the display device of a procedure turn symbol associated with a procedure turn from a navigation point, the procedure turn defined by a first radial extending from the navigation point and having a length equal to a maximum distance criterion;

displaying an aircraft symbol representing the aircraft in its current location;

overlaying, on the display device, a shape representing a geographic area defined by the first radial, a second radial perpendicular to the first radial and extending a length equal to the maximum distance criterion from the navigation point, and an arc tracing out the maximum distance criterion between the first and second radial;

displaying the procedure turn symbol in a first visually distinguishing characteristic if a current altitude of the aircraft is below a minimum altitude criterion; and displaying the shape in a second visually distinguishable characteristic when the aircraft symbol has departed the geographic area.

2. The method of claim 1, further comprising displaying the shape in a third visually distinguishing characteristic if the aircraft will be going below the minimum altitude criterion.

3. The method of claim 1, wherein the shape comprises an outline rendered in a first format, the method further comprising rendering the outline of the shape in a second format when the aircraft symbol has departed the geographic area.

4. The method of claim 1, further comprising displaying a moving terrain map associated with an instantaneous location of the aircraft on the display device, wherein the procedure turn symbol is displayed overlying the moving terrain map.

5. The method of claim 1, wherein the navigational point is proximate a landing location and associated with an approach path for the landing location, wherein the method further comprises displaying a graphical representation of the approach path on the display device.

6. The method of claim 1, further comprising providing an audible warning if the aircraft is departing the geographic area.

7. A method for indicating on a display device associated with an aircraft whether the aircraft is satisfying defined criteria for a maneuver, the method comprising:

identifying a procedure turn, the procedure turn defined by a first radial extending from the navigation point to a published maximum distance criterion from the navigation point, wherein the published maximum distance criterion is a distance for which the aircraft is not to exceed when flying the procedure turn;

displaying symbols on the display device for the current location of the aircraft and the procedure turn;

overlaying, on the display device, a shape having a first visually distinguishable characteristic and representing a geographic area defined by the first radial, a second radial perpendicular to the first radial and extending a length equal to the maximum distance criterion from the navigation point, and an arc tracing out the maximum distance criterion between the first and second radial, when the aircraft symbol is within the geographic area; and displaying the shape in a second visually distinguishing characteristic if a current altitude of the aircraft is below a minimum altitude criterion.

8. The method of claim 7 wherein the shape comprises a outline rendered in a first format, the method further comprising rendering the outline of the shape in a second format when the aircraft symbol has departed the geographic area.

9. The method of claim 7, further comprising displaying a moving terrain map associated with an instantaneous location of the aircraft on the display device, and wherein the symbols and shape displayed overlie the terrain map.

10. The method of claim 7, wherein the navigational reference point is proximate a landing location and associated with an approach path for the landing location, wherein the method further comprises displaying a graphical representation of the approach path on the display device.

11. The method of claim 7, further comprising providing an audible warning if the current altitude of the aircraft is less than the published minimum altitude criterion, or the current distance of the aircraft is beyond the published maximum distance criterion.

12. A system for notifying the aircrew of an aircraft when descending below or predicted to descend below a published minimum altitude criterion or beyond a published maximum distance criterion from a navigation point during execution of a procedure turn, comprising:

a flight management system configured to:
  store data including the published minimum altitude criterion and the published maximum distance criterion for the procedure turn;
  determine the current or predicted location and altitude of the aircraft; and
  determine if the aircraft is below the published minimum altitude criterion or beyond the published maximum distance criterion;

a display device configured to:
  display a moving map including terrain;
  display an icon of the aircraft in its current location on the moving map;
  display an icon of the procedure turn on the moving map;
  display on the moving map a shape representing a geographic area associated with the procedure turn, the shape having a first visually distinguishing characteristic if the aircraft goes below the published minimum altitude criterion, the geographic area defined by first and second radials, each having a length equal to the maximum distance criterion, the first and second radials oriented perpendicular to one another, and an arc tracing out the maximum distance criterion between the first and second radial; and display the shape in a second visually distinguishing characteristic if the aircraft goes beyond the published maximum distance criterion.

13. The system of claim 12 wherein:
the flight management system is further configured to:
  determine if the aircraft will be going below the published minimum altitude criterion or beyond the published maximum distance criterion in consideration of current flight data; and
the display device is further configured to:
  display an outline of the shape in a third visually distinguishing characteristic if the aircraft will be going below the published minimum altitude criterion, and display the outline of the shape in a fourth visually distinguishing characteristic if the aircraft will be going beyond the published maximum distance criterion.

14. The system of claim 12, wherein the display device is further configured to:
  provide an audible alert if the current altitude of the aircraft is less than the published minimum altitude criterion, or the current distance of the aircraft is beyond the published maximum distance criterion.

* * * * *